April 5, 1960 J. B. KUCERA 2,931,642
SPRING STABILIZER ATTACHMENT
Filed Sept. 21, 1954 2 Sheets-Sheet 1
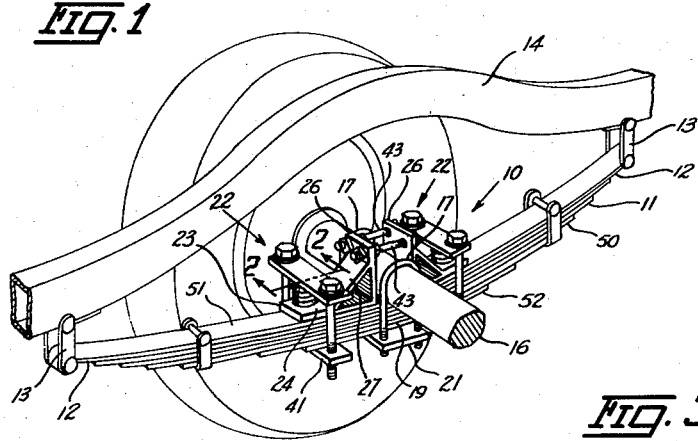
Fig. 1
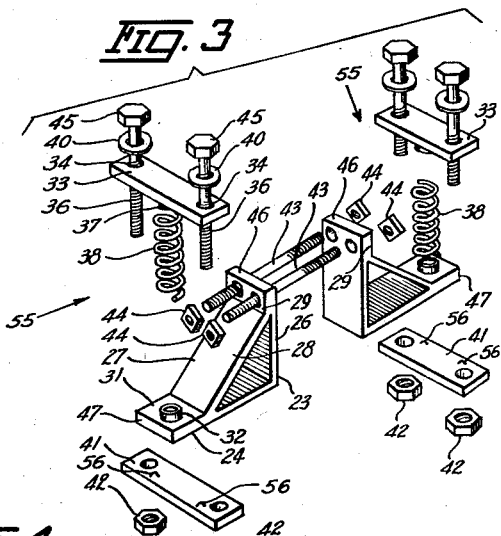
Fig. 2
Fig. 3
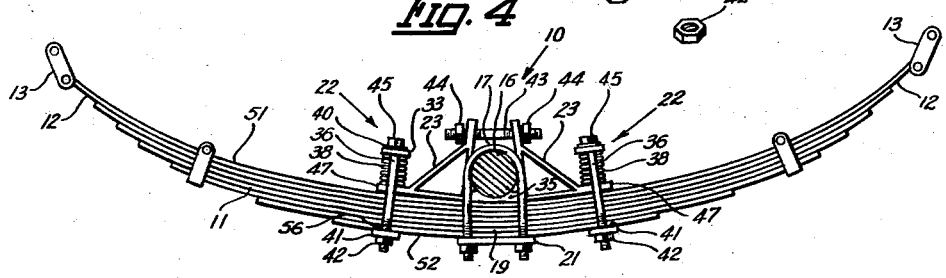
Fig. 4
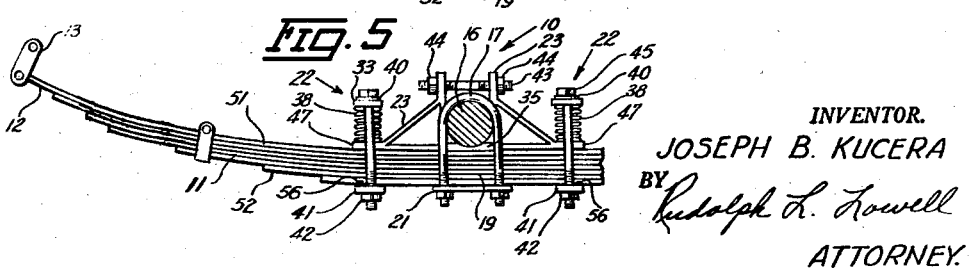
Fig. 5
INVENTOR.
JOSEPH B. KUCERA
BY Rudolph L. Lowell
ATTORNEY.

April 5, 1960  J. B. KUCERA  2,931,642
SPRING STABILIZER ATTACHMENT
Filed Sept. 21, 1954  2 Sheets-Sheet 2
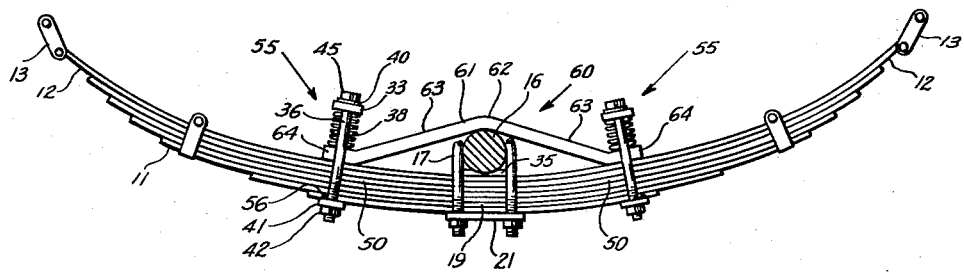
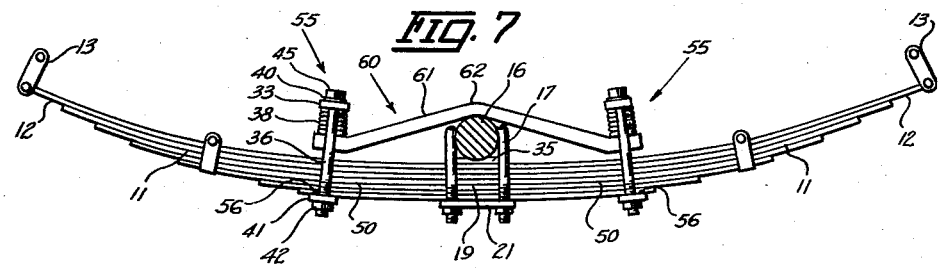
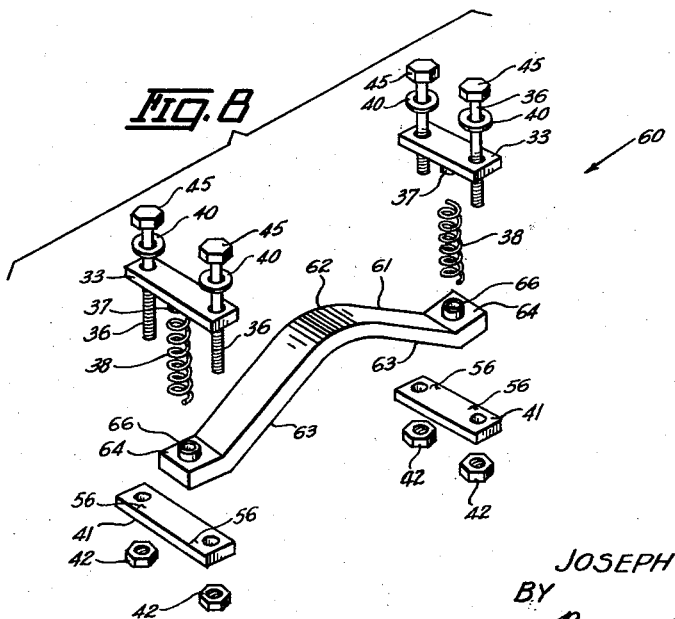
INVENTOR.
JOSEPH B. KUCERA
BY
Rudolph L. Lowell
ATTORNEY.

United States Patent Office 2,931,642
Patented Apr. 5, 1960

2,931,642

SPRING STABILIZER ATTACHMENT

Joseph B. Kucera, Traer, Iowa

Application September 21, 1954, Serial No. 457,353

1 Claim. (Cl. 267—16)

This invention relates generally to vehicle springs and more particularly to spring stabilizer attachments for automobile body supporting springs.

Most automobiles are now equipped with the usual upwardly curved semi-elliptical leaf springs which are generally satisfactory during normal use of the automobile. However, when the automobile is heavily loaded, such springs naturally tend to straighten or flatten out so that their flexing action and ability to cushion any up and down movement of the vehicle body is appreciably reduced. Further, when an automobile is traveling on an extremely rough surface, these springs are not capable, by themselves, of cushioning the continuous up and down movement of the vehicle body and require shock absorbing devices.

It is an object of this invention, therefore, to provide an improved spring stabilizer attachment for a vehicle body supporting spring.

A further object of this invention is to provide a stabilizer attachment for a semi-elliptical spring which is attached directly to an intermediate portion of such spring for restraining curvature changes in the spring.

Another object of this invention is to provide a stabilizer attachment for vehicle body supporting springs which is adjustable during installation and adapted for assembly with the supporting springs on substantially all automobiles now in use.

A further object of this invention is to provide a stabilizer attachment for a semi-elliptical spring which yieldably restrains any change in curvature of the spring, and which is adjustable to vary the extent of such restraining action.

Another object of this invention is to provide a stabilizer attachment for a semi-elliptical vehicle spring which is operable to re-arch the spring.

A further object of this invention is to provide a spring stabilizer attachment which is quickly and easily mounted on a vehicle supporting spring, economical to manufacture, and capable of operating over prolonged periods of time to efficiently complement the action of the supporting spring.

Further objects, features and advantages of this invention will become apparent from a consideration of the following description when taken in connection with the accompanying drawing in which:

Fig. 1 is a perspective view of a vehicle supporting spring mounted on a vehicle, only a portion of which is shown, and showing the spring stabilizer attachment of this invention in assembly relation therewith;

Fig. 2 is a sectional detail view looking along the line 2—2 in Fig. 1;

Fig. 3 is an exploded perspective view of the stabilizer attachment of this invention.

Fig. 4 is a side elevational view of the spring and stabilizer attachment shown in Fig. 1, showing the spring flexed in a direction to decrease the radius of curvature thereof;

Fig. 5 is a fragmentary foreshortened side elevational view of the spring and stabilizer attachment, illustrated similarly to Fig. 4, and showing the spring flexed in a direction to increase the radius of curvature thereof;

Figs. 6 and 7 are are side elevational views of a modified form of spring stabilizer attachment, illustrated similarly to Figs. 4 and 5, respectively; and Fig. 8 is an exploded perspective view of the modified form of spring stabilizer attachment.

With reference to the drawing, the spring stabilizer attachment of this invention, indicated generally at 10, is shown in Fig. 1 in assembly relation with a usual vehicle spring 11, of semi-elliptical type. The spring 11 is bowed downwardly and is movably supported at its ends 12 by the usual spring shackles 13 which are pivotally mounted on a vehicle rear frame portion 14. A central portion 19 of the spring 11 is arranged below the rear axle 16 and is clamped thereto in the usual manner by U-bolts 17 carried by the axle 16 on transversely opposite sides of the spring 11, and connected at their lower ends to a transverse plate 21 which engages the bottom side of the central spring portion 19.

The spring stabilizer attachment 10 consists of a pair of stabilizer units 22 (Figs. 1, 3, 4 and 5) clamped to the spring 11 on opposite sides of the rear axle 16, and connected together for cooperative action in a manner to be hereinafter described. Since the stabilizer units 22 are identical, only one unit 22 will be described in detail with like numerals indicating like parts for the two units 22.

With reference to Figs. 1 and 3, a stabilizer unit 22 includes a generally L-shape bracket member 23 having a substantially horizontal leg 24 and a substantially upright leg 26. A reinforcing or gusset plate 27 has an inclined intermediate section 28, an upright end section 29 formed integral with a top end portion of the upright bracket member leg 26, and a substantially horizontal end section 31 integrally formed with an outer end portion of the bracket member horizontal leg 24.

A short tubular member 32 is secured to and extends upwardly from a central portion of the top side of the horizontal end section 31 of the plate 27. Arranged above and in a spaced relation with the end section 31, is a substantially horizontal flat strap or bar member 33 extended transversely of the bracket 23, and formed adjacent its ends with openings 34 for receiving a pair of upright bolts 36. Secured to an extended downwardly from a central portion of the underside of the strap 33 (Figs. 2 and 3), is a short tubular section 37 similar to and vertically aligned with the tubular section 32 secured to the end section 31 of the gusset plate 27. A compression spring 38 extends between and has its ends positioned about the vertically aligned tubular sections 32 and 37.

In assembly, the stabilizer units 22 are arranged on the top side of the vehicle spring 11 on opposite sides of the rear axle 16, as shown in Fig. 1, with the bracket members 23 arranged such that their upright legs 26 are adjacent to opposite sides of the axle 16 and against opposite ends of a saddle plate 35 positioned between the axle 16 and the spring 11. A bearing plate 41, for each stabilizer unit 22, is positioned against and extended transversely of the bottom side of the spring 11 in a vertically aligned relation with a corresponding strap 33. The lower ends of the upright bolts 36, which bolts are equipped with washers 40 positioned between the bolt heads 45 and the straps 33, are extended through opposite ends of the bearing plate 41, and nuts 42 are advanced on the bolts 36 into engagement with the under side of the plate 41.

It is seen, therefore, that each stabilizer unit 22 is yieldably and releasably clamped or connected to the top side of the vehicle spring 11 by the upright bolts 36 positioned on transversely opposite sides of the spring 11. In other words, the bolts 36 act to hold the bearing plates 41 against the underside of the spring 11 and to force the straps 33 downwardly against the top ends of the springs 38 which in turn exert downward pressures on the outer ends 47 of the bracket legs 24.

The springs 38, bearing plates 41, straps 33 and bolts 36 thus constitute yieldable clamping units 55 for clamping the attachment 10 to the spring 11. Beads or projections 56 on each bearing plate 41 are positioned on transversely opposite sides of the spring 11 to maintain the plate 41 against movement transversely of the spring.

The stabilizer units 22 are connected together by a pair of transversely spaced stud members 43 extended longitudinally of the spring 11 and having their opposite ends extended through the upright legs 26 of the brackets 23 at positions above the rear axle 16. Nuts 44 are advanced on the opposite ends of the studs 43 into engagement with the end sections 29 of the gusset plates 27. The stabilizer bracket members 23, when connected together by the studs 43, thus constitute a single bracket unit.

From a consideration of Figs. 1, 4 and 5, it is seen, that upon tightening of the nuts 44 on the studs 43, the effective lengths of the studs 43 are reduced, and the upper ends 46 of the bracket members 23 are moved toward each other. As a result, the brackets 23 are swung or rotated about the lower ends of their legs 26 which are against opposite ends of the saddle plate 35, so that the outer ends 47 of the brackets 23 are moved upwardly. By virtue of the connection of the horizontal legs 24 of the brackets 23 to the bearing plates 41, through the springs 38, straps 33 and bolts 36, the bearing plates 41 are in turn moved upwardly by an amount dependent on the degree of compression of the springs 38. In other words, if a spring 38 is substantially loose or uncompressed so as to be capable of substantial compression, this upward movement of the outer ends 47 of the brackets 23 is merely transmitted to the spring 38 which is compressed a corresponding amount. Thus, the vertical position of the bearing plate 41 remains unchanged, namely, fixed relative to the axle 16.

However, if the condition of a spring 38 is such that it may effectively resist substantial compression (Fig. 4), the corresponding bearing plate 41 is moved upwardly a distance corresponding to the difference between the distance the outer end 47 of the horizontal leg 24 is moved upwardly and the distance the spring 38 is compressed. It is apparent that this upward movement of the bearing plates 41 effects an upward movement of the outer ends 12 of the vehicle spring 11, so as to decrease the radius of curvature of the spring 11. The relative upward movement of the ends 12 of the spring 11 is determined by the advance of the nuts 44 on the studs 43.

It is seen, therefore, that upon manipulation of the nuts 44 on the studs 43 to move the top ends 46 of the bracket members 23 toward each other, the vehicle spring 11 is effectively re-arched. As a result, when the vehicle spring 11 tends to flatten out, due to either prolonged use of the spring 11 or an unusually heavy load on the main frame member 14, the spring 11 is readily re-arched so as to be capable of a normal flexing action to cushion the up and down movement of the vehicle body. Likewise, the radius of curvature of the spring 11 may be increased by merely loosening the nuts 44 on the studs 43.

As above described, the degree of compression of the coil springs 38 determines the extent to which the nuts 44 are advanced on the studs 43 to effect a desired re-arching of the vehicle spring 11. The compression of a spring 38 is adjusted by manipulation of the nuts 42 on the bolts 36 for a corresponding unit 22. Thus, relative manipulation of the nuts 42 on the bolts 36 and the nuts 44 on the studs 43 readily effects the desired re-arching of the vehicle spring 11.

During normal use of the spring 11, and with the spring 11 arched the desired extent, the portions 50 of the spring 11 on opposite sides of the rear axle 16 flex in an up and down direction to cushion the up and down movement of the main frame member 14. By virtue of the compression springs 38, the stabilizer attachment 10 assists or complements such cushioning action of the vehicle spring 11 in the following manner.

When the load on a vehicle spring 11 is increased so that the spring is flexed in a downward direction, as illustrated in Fig. 5, the spring 11 tends to move the bearing plates 41 downwardly relative to the axle 16. However, such downward movement of the bearing plates 41 is resisted by the springs 38 which exert yielding upward forces on the straps 33. These forces are transmitted by the bolts 36 to the bearing plates 41. Thus any downward flexing action of the vehicle spring 11 is yieldably resisted by the compression springs 38 which thus complement the cushioning action of the spring 11. Since the degree of compression of the springs 38 is adjustable by manipulation of the nuts 42 on the bolts 36, the amount of such resistance to downward flexing movement of the vehicle spring 11 is readily varied.

As best appears in Fig. 4, during upward flexing movement of the vehicle spring 11, the top side 51 of the spring 11 is flexed or curved more than the bottom side 52 of the spring 11. As a result, the outer ends 47 of the bracket members 23 are moved upwardly relative to the bearing plates 41. However, by virtue of the engagement of the compression springs 38 with the top sides of the gusset plate end sections 31, any upward movement of the bracket outer ends 47 relative to the bearing plates 41 is yieldably resisted by the compression springs 38. Thus, the compression springs 38 likewise act to assist the cushioning movement of the vehicle spring 11 during upward flexing movement of the spring 11. The stabilizer attachment 10 and vehicle spring 11 thus provide complementary spring actions and constitute a spring assembly for the vehicle capable of operating more efficiently under varying road and load conditions, than the spring 11 alone.

A modified form of stabilizer attachment 60 is illustrated in Figs. 6–8, inclusive, which is identical in all respects to the attachment 10 shown in Figs. 1–5, inclusive, except that a single bracket member 61 is used in place of the two brackets 23 which are connected by the studs 43 in the assembly 10. Like parts on the attachments 10 and 60 are, therefore, indicated by like numerals.

The bracket member 61 (Fig. 8) which is of a width corresponding substantially to the width of the spring 11, is of a generally inverted spread U-shape having a short curved base section 62 integrally formed with diverged leg sections 63 terminating in oppositely extended flat end sections 64. A short tubular member 66 is secured to and extends upwardly from the top side of each end section 64.

In assembly, the bracket member 61 is arranged on the top side of the vehicle spring 11 at a position extended transversely of the axle 16. As best appears in Figs. 6 and 7, the bracket base portion 62 is supported on the top side of the axle 16 and is of a curvature corresponding substantially to that of the axle 16. The yieldable clamping units 55, heretofore described in detail with respect to the attachment 10, are manipulated to clamp the bracket member end sections 64 to the portions 50 of the spring 11 on opposite sides of the axle 16. Each compression spring 38 in a clamping unit 55 extends between a corresponding bracket end section 64 and a strap 33 and has its ends positioned about the tubular sections 66 and 37, The operation of the stabilizer attachment 60, to complement the vehicle spring 11, is identical with the operation of the attachment 10 above described. It is to be noted, however, that by virtue of the one-piece construction of the bracket 61 in the attachment 60, no rearching of the spring 11 can be effected with the attachment 60.

From the above description, it is seen that this invention provides spring stabilizer attachments 10 and 60 which are of a compact construction and which effectively operate to yieldably resist the flexing action of the spring 11. By virtue of the adjustable clamping bolts 36, the attachments 10 and 60 are readily installed on substantially any semi-elliptical spring 11 now in use. Also, on adjustment of the bolts 36, the spring stabilizer attachments 10 and 60 may be adjusted to provide a smooth ride for a vehicle body under substantially all load and road conditions applied to the spring 11.

The adjustable studs 43 provide for a further adjustment of the attachment 10, to insure the desired smooth ride, and in addition provide for the vehicle spring 11 being readily rearched.

Although the invention has been described with respect to several embodiments thereof, it is to be understood that it is not to be so limited, since changes can be made therein which are within the full intended scope of this invention as defined by the appended claim.

I claim:

For use with a vehicle having an axle and a semi-elliptical spring connected intermediate its ends to said axle; a spring stabilizer attachment comprising a unitary bracket member of a substantially V-shape extended longitudinally of said spring on the concave side thereof, said bracket having a base portion positioned in contact with said axle, and leg portions arranged in a straddling relation with said axle with the free ends of said leg portions positioned in contact with spaced portions of said spring adjacent to said axle, and yieldable clamping units positioned about said free end portions and said spring portions for clamping said attachment to said spring.

References Cited in the file of this patent
UNITED STATES PATENTS

| | | |
|---|---|---|
| 1,203,001 | Hood | Oct. 31, 1916 |
| 1,215,122 | Crook | Feb. 6, 1917 |
| 1,426,013 | Schrum et al. | Aug. 15, 1922 |
| 1,482,674 | Bussee | Feb. 5, 1924 |
| 1,536,884 | Fioroni et al. | May 5, 1925 |
| 2,690,334 | Bishop et al. | Sept. 28, 1954 |
| 2,762,445 | Polhemus et al. | Sept. 11, 1956 |

FOREIGN PATENTS

| | | |
|---|---|---|
| 397,951 | Great Britain | Sept. 7, 1933 |